United States Patent
Saeki et al.

(10) Patent No.: US 11,939,021 B2
(45) Date of Patent: Mar. 26, 2024

(54) STRADDLE VEHICLE HAVING A CAMERA

(71) Applicant: KAWASAKI MOTORS, LTD., Akashi (JP)

(72) Inventors: Daisuke Saeki, Kobe (JP); Shinji Ikeda, Akashi (JP); Mitsuru Kobayashi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 648 days.

(21) Appl. No.: 17/247,663

(22) Filed: Dec. 18, 2020

(65) Prior Publication Data

US 2021/0188385 A1 Jun. 24, 2021

(30) Foreign Application Priority Data

Dec. 19, 2019 (JP) .................................. 2019-228876

(51) Int. Cl.
  *B62J 50/00* (2020.01)
  *B62J 11/00* (2020.01)

(52) U.S. Cl.
  CPC ............... *B62J 50/00* (2020.02); *B62J 11/00* (2013.01)

(58) Field of Classification Search
  CPC ... B62J 50/00; B62J 11/00; B62J 17/04; B62J 45/00; B62J 45/42
  See application file for complete search history.

(56) References Cited

U.S. PATENT DOCUMENTS

| | | | |
|---|---|---|---|
| 2008/0239080 A1 | 10/2008 | Moscato | |
| 2016/0241816 A1 | 8/2016 | Noguchi et al. | |
| 2020/0398924 A1* | 12/2020 | Kuroba | B62J 45/42 |

FOREIGN PATENT DOCUMENTS

| | | |
|---|---|---|
| EP | 3476708 | 5/2019 |
| EP | 3508407 | 7/2019 |
| JP | 2010-191008 | 9/2010 |
| JP | 6178862 B2 | 8/2017 |
| JP | 2019014293 | 1/2019 |
| WO | 2017/221410 | 12/2017 |

OTHER PUBLICATIONS

JP 2019014293 Translation (Year: 2019).*

* cited by examiner

*Primary Examiner* — Twyler L Haskins
*Assistant Examiner* — Angel L Garces-Rivera
(74) *Attorney, Agent, or Firm* — Fay Kaplun & Marcin, LLP (57) ABSTRACT

A motorcycle includes a camera stay, a camera, a vibration reduction cover, and an attachment cover. The camera photographs the front area of the motorcycle. The vibration reduction cover is made of the elastic material and covers at least two surfaces of the camera facing each other. The attachment cover holds the camera via the vibration reduction cover and is attached to the camera stay.

8 Claims, 7 Drawing Sheets

STRADDLE VEHICLE HAVING A CAMERA

FIELD OF THE INVENTION

The present invention relates to a straddle vehicle including a camera.

BACKGROUND

Japanese Patent No. 6178862 discloses a motorcycle including a camera for photographing an area in front of the motorcycle.

In Japanese Patent No. 6178862, a head pipe of the motorcycle is provided with a stay for attaching the camera. Specifically, a sheet-shaped vibration absorber is attached to one side of the stay in a vehicle width direction. A loop part of a hook-and-loop fastener is attached to the vibration absorber. A hook part of the hook-and-loop fastener is affixed to the camera. This configuration allows the camera to be attached to the stay.

SUMMARY OF THE INVENTION

The configuration of Japanese Patent No. 6178862 may not sufficiently reduce the vibration transmitted to the camera. Furthermore, the camera may not be firmly attached to the stay. The problem is not limited to motorcycles, but is common to all straddle vehicles.

The present invention relates to a straddle vehicle in which a camera is firmly attached while sufficiently reducing vibration transmitted to the camera.

An aspect of the present invention provides a straddle vehicle as follows. That is, the straddle vehicle includes a camera stay, a camera, a vibration reduction cover, and an attachment cover. The camera photographs an area in front of the straddle vehicle. The vibration reduction cover is made of an elastic material. The vibration reduction cover covers at least two surfaces facing each other among surfaces of the camera. The attachment cover holds the camera via the vibration reduction cover. The attachment cover is attached to the camera stay.

This allows the camera to be attached to the vehicle body while reducing vibration of the camera with a simple structure. The two facing surfaces of the camera are covered with the vibration reduction cover, and the camera is held by the attachment cover. As a result, the camera can be firmly attached to the camera stay with sufficient vibration reduction.

According to the present invention, it is possible to realize a straddle vehicle in which a camera is firmly attached while sufficiently reducing vibration transmitted to the camera.

DETAILED DESCRIPTION

Next, embodiments of the present invention will be described with reference to the drawings. In the following explanation, the left-right direction of the motorcycle (straddle vehicle) 1 is defined based on the view from a driver (rider) riding on the motorcycle 1. Therefore, the front-rear direction coincides with a vehicle length direction and the left-right direction coincides with a vehicle width direction. The up-down direction (vertical direction) coincides with a height direction.

Figure 1:
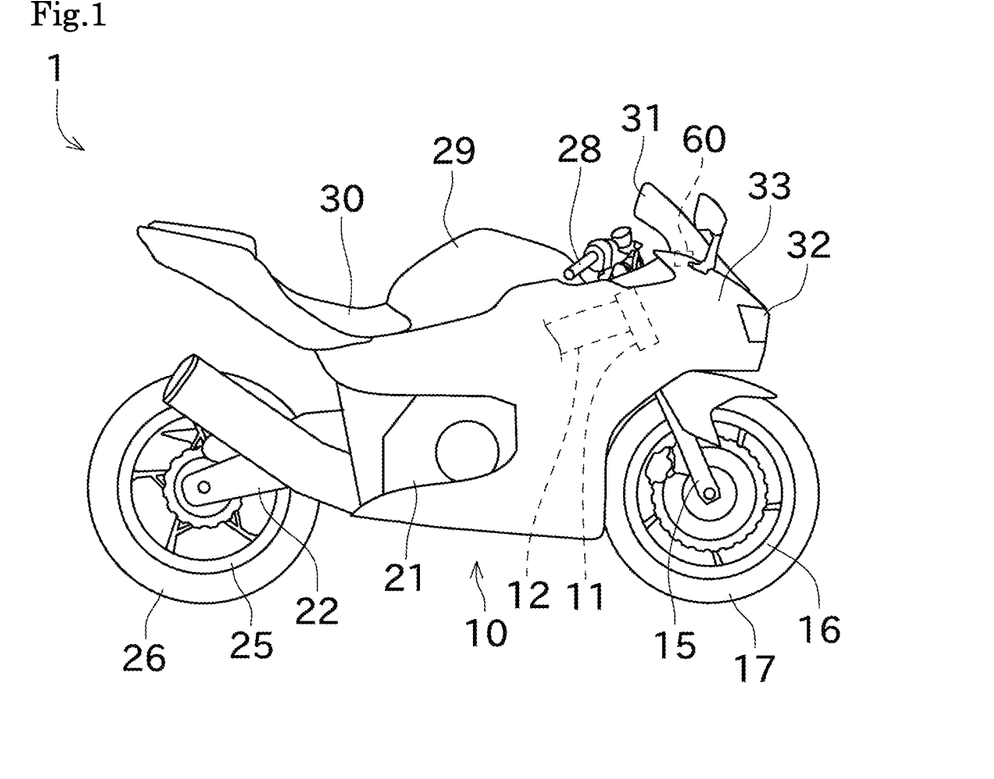
FIG. 1 is a side view of a motorcycle of an embodiment of the present invention.

First, an outline of the motorcycle 1 of this embodiment will be described with reference to FIG. 1. FIG. 1 is a side view of the motorcycle 1.

As shown in FIG. 1, a motorcycle 1 is provided with a vehicle body 10. The vehicle body 10 includes a plurality of body frames as a framework of the motorcycle 1. The motorcycle 1 is provided with a head pipe 11 and a main frame 12 as the body frame. The configuration of the body frames is an example, and may be different.

The head pipe 11 has a shaft insertion hole for inserting a steering shaft (not shown). An upper bracket is located above the head pipe 11. A lower bracket is located below the head pipe 11. The upper bracket and the lower bracket have fork insertion holes for inserting the left and right front forks 15, respectively. A front wheel 16 is rotatably attached to the lower part of the front fork 15. A front tire 17 is attached on the front wheel 16.

The main frame 12 is connected to the head pipe 11. The main frame 12 is arranged to extend rearward from the head pipe 11. An engine 21 is attached to the main frame 12 directly or via another member. A swing arm 22 is attached to the rear part of the main frame 12. A rear wheel 25 is rotatably attached to the rear part of the swing arm 22. A rear tire 26 is attached to the rear wheel 25.

The engine 21 generates power, and the power is transmitted to the rear wheel 25 via the drive chain (not shown). This allows the motorcycle 1 to be driven. The engine 21 in this embodiment is a gasoline engine. In place of or in addition to the gasoline engine, another drive source, such as an electric motor for driving, may be provided.

A handlebar-type steering handle 28 is arranged near the upper end of the front fork 15. By turning the steering handle 28 by the driver, the front forks 15 are turned so that the motorcycle 1 can be turned and the direction of travel can be changed. The motorcycle 1 is a lean type vehicle that is a vehicle in which the vehicle body 10 is inclined relative to a road surface toward a center of the turn when turning.

A fuel tank 29 is arranged behind the steering handle 28 and above the engine 21, and the fuel tank 29 stores fuel for supplying the engine 21. A seat 30 for the driver to be seated is arranged behind the fuel tank 29. A step (not shown) is arranged on the left side and the right side of the vehicle body 10, respectively. The driver straddles the seat 30 and places his feet on the left step and right step. Thus, since the driver is seated astride the seat 30, the motorcycle 1 is a straddle vehicle.

A windscreen 31 is arranged in front of the steering handle 28. The windscreen 31 is arranged to extend backwardly and upwardly from the lower end (base). With this configuration, the windscreen 31 guides the driving wind to make the driving wind less likely to hit the driver. The windscreen 31 is transparent or translucent, and the windscreen 31 can transmit visible light in order to ensure the driver's vision.

A headlight 32 is arranged in the front of the vehicle body 10 to irradiate the front of the vehicle. The light source of the headlight 32 is, for example, an incandescent bulb, a halogen bulb, a high-intensity-discharge (HID) lamp, or a light-emitting diode (LED). The headlight 32 of this embodiment is arranged so that the headlight 32 overlaps with the center of the vehicle width direction. The "overlap with the center of the vehicle width direction" means, for example, that the virtual line passing through the center of the motorcycle 1 in the vehicle width direction in plan view overlaps with the headlight 32. The headlights 32 may be provided in pairs, for example, a pair of right and left headlights.

A cowl is arranged on the outer surface of the motorcycle 1. The cowl is provided for the purpose of reducing the aerodynamic drag of the motorcycle 1, protecting the various parts of the motorcycle 1, and improving the appearance of the motorcycle.

In this specification, the cowl arranged primarily at the front part of the motorcycle 1 is referred to as the front cowl 33. The front part of the motorcycle 1 is the part of the motorcycle 1 that is forward of the center in the vehicle length direction of the motorcycle 1, for example, the part that is forward of the seat 30. The front cowl 33 is shaped to protrude forward. Therefore, a recess is formed behind the front cowl 33 or in the front cowl 33, and a space is formed by this recess in the front cowl 33. The outline of the front cowl 33 includes portions that decrease in size in the vehicle width direction and in the height direction as they approach the front. As a result, the space in the front cowl 33 also includes portions that decrease in size in the vehicle width direction and height direction as they approach the front. In the front cowl 33, a headlight 32 or the like is arranged.

Next, the camera 60 provided by the motorcycle 1 will be described. The camera 60 is located at the front part of the vehicle body 10. Specifically, the camera 60 is located in front of the steering handle 28 and behind the windscreen 31. The camera 60 is located so as to overlap with the center of the vehicle width direction. The camera 60 photographs an area in front of the motorcycle 1 through the windscreen 31. In other words, the camera 60 detects visible light from the outside, which is transmitted through the windscreen 31, and generates an image. The image generated by the camera 60 is output to the control unit (not shown). The control unit detects a foregoing vehicle, an oncoming vehicle, an obstacle, or a pedestrian, etc., based on the image, and performs control according to the detection result. For example, the control unit changes the irradiation direction or the irradiation position of the headlight 32 so as not to irradiate the light to the foregoing vehicle and the oncoming vehicle. Alternatively, the control unit operates the brakes to assist in preventing collisions with the obstacle or the pedestrian.

Figure 2:
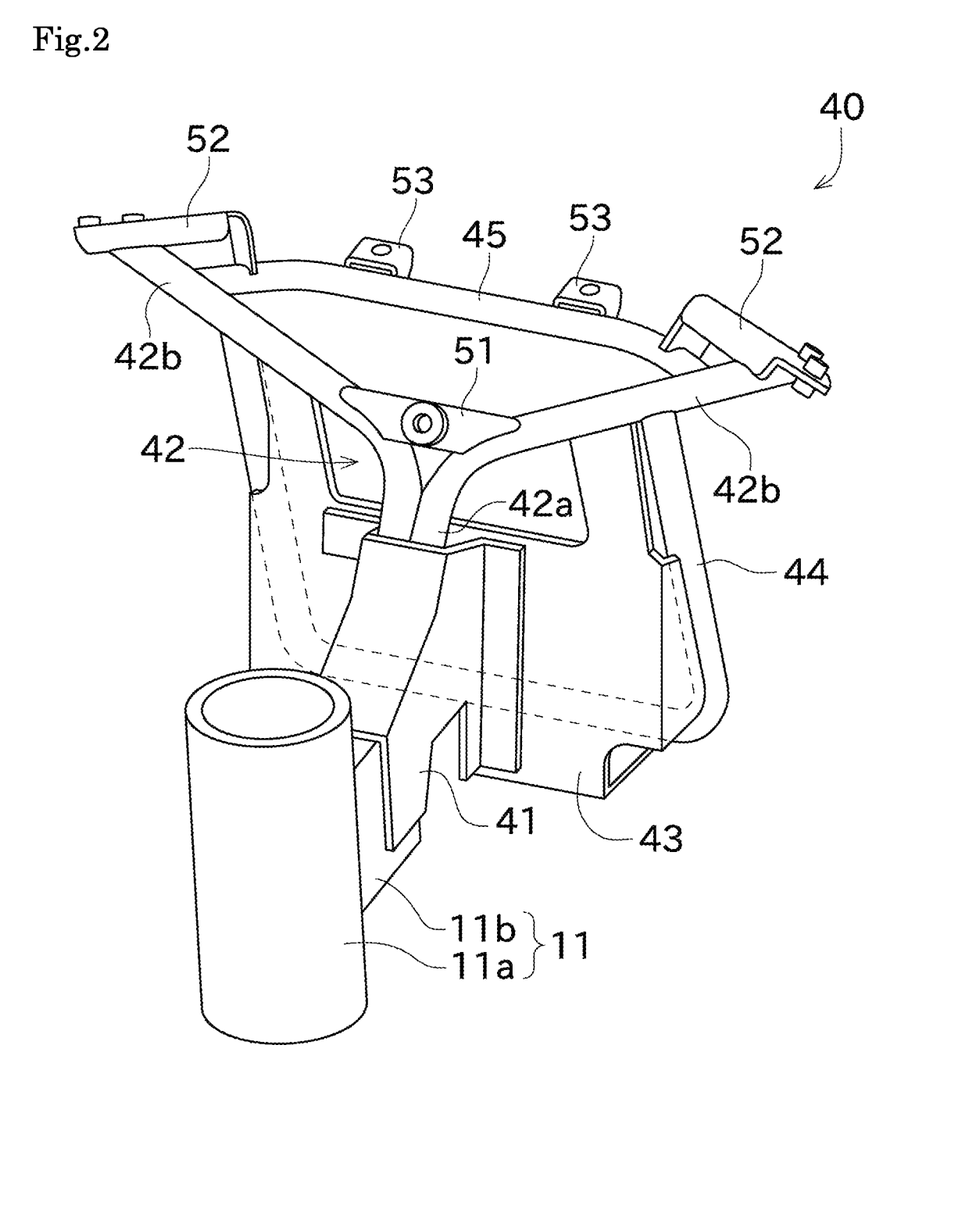
FIG. 2 is a perspective view of a support frame viewed from rear of the motorcycle.

Next, a frame structure for supporting the camera 60 will be described with reference to FIG. 2. As shown in FIG. 2, the head pipe 11 has a cylindrical portion 11a in which a shaft insertion hole is formed, and an attachment base 11b extending forward from the cylindrical portion 11a. The cylindrical portion 11a and the attachment base 11b are connected by welding, for example.

A support frame 40 is attached to the attachment base 11b. The support frame 40 is connected to the head pipe 11 and is located forward of the head pipe 11. The support frame 40 is a frame for supporting a plurality of electrical components including the camera 60. The support frame 40 has a connection frame 41, a branch frame 42, a plate-shaped frame 43, a hanging frame 44, and a front frame 45.

The connection frame 41 is a frame for connecting with the attachment base 11b. The connection frame 41 is configured to allow insertion of the attachment base 11b. The connection frame 41 and the attachment base 11b are connected by using, for example, a fixture such as a bolt and nut which are not shown in figures. The connection frame 41 and the attachment base 11b may be connected by welding.

The branch frame 42 includes a branch point. The branch frame 42 has a junction portion 42a at the rear side from the branch point and a branch portion 42b at the front side from the branch point. The junction portion 42a is connected to the connection frame 41. The branch portion 42b branches from the branch point so as to spread to one side and the other side in the vehicle width direction.

The plate-shaped frame 43 is a plate-shaped member having an abbreviated L-shape. The plate-shaped frame 43 is connected to both the connection frame 41 and the branch portion 42b. A plurality of stays for attaching electrical components and the like are connected to the front surface of the plate-shaped frame 43.

The hanging frame 44 is an abbreviated U-shaped pipe-like member. One end of the hanging frame 44 is connected to the branch portion 42b, and the other end of the hanging frame 44 is connected to the other side of the branch portion 42b. As a result, the hanging frame 44 is supported in a hanging manner. A plurality of stays for attaching electrical components or the like are connected to the front side of the hanging frame 44.

The front frame 45 extends in the vehicle width direction. In other words, the longitudinal direction of the front frame 45 coincides with the vehicle width direction. The front frame 45 connects the left and right branch portions 42b. Specifically, the left end of the front frame 45 is connected to the left branch portion 42b, and the right end of the front frame 45 is connected to the right branch portion 42b.

The support frame 40 is provided with a meter stay 51, a mirror stay 52, and a camera stay 53. The meter stay 51 is a member for attaching the meter device 34 and is connected near the branch point of the branch frame 42. The meter device 34 is a display device that shows a vehicle speed and an engine speed, etc. The meter device 34 is attached by the meter stay 51 and other stays. The mirror stay 52 is a member for attaching the left and right side mirrors and is connected to both the branch portion 42b and the front frame 45. The camera stay 53 is a member for attaching the camera 60 and is connected to the front frame 45. A camera 60 is attached on the two camera stays 53. The camera stays 53 are formed to project forward from the front frame 45. This allows the camera 60 to be located forward. The forward position of the camera 60 makes it difficult to photograph the motorcycle 1 itself.

Figure 3:
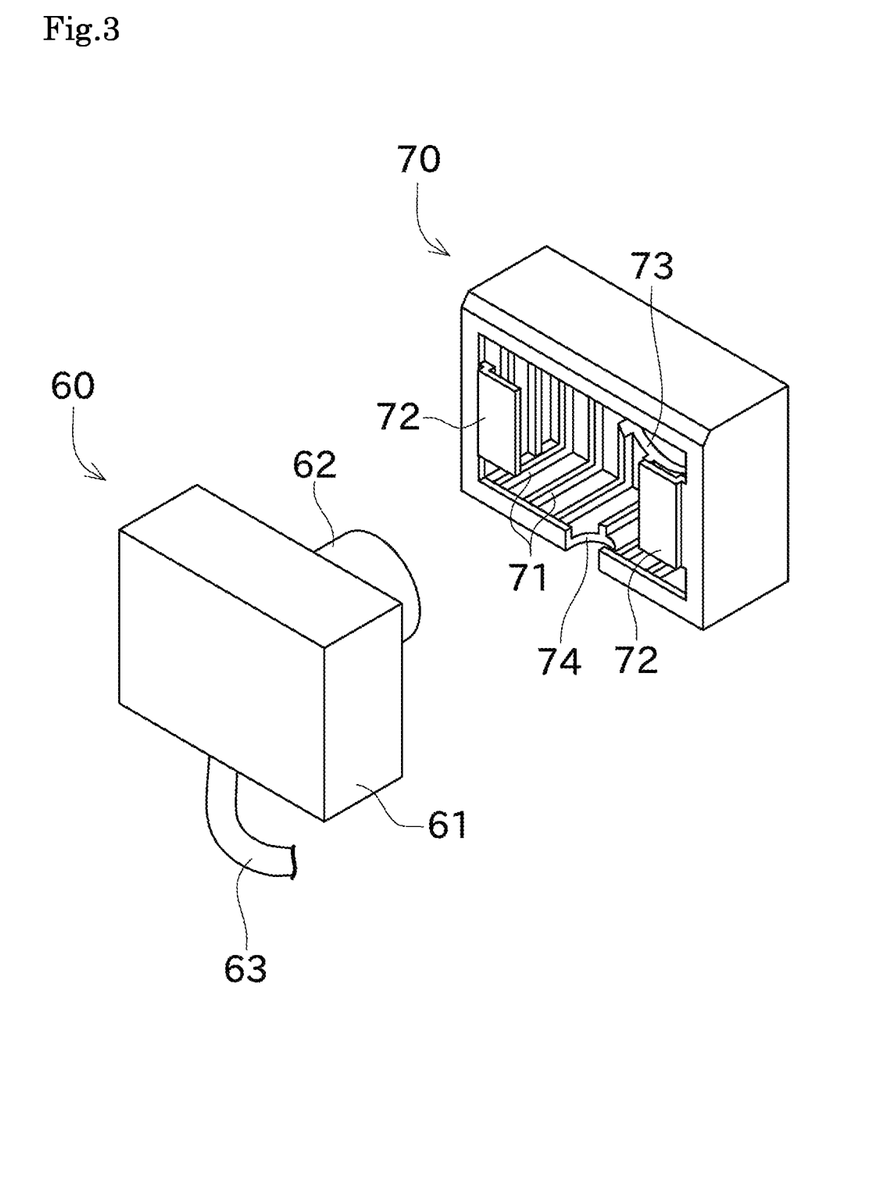
FIG. 3 is a perspective view of a camera and a vibration reduction cover.
Figure 4:
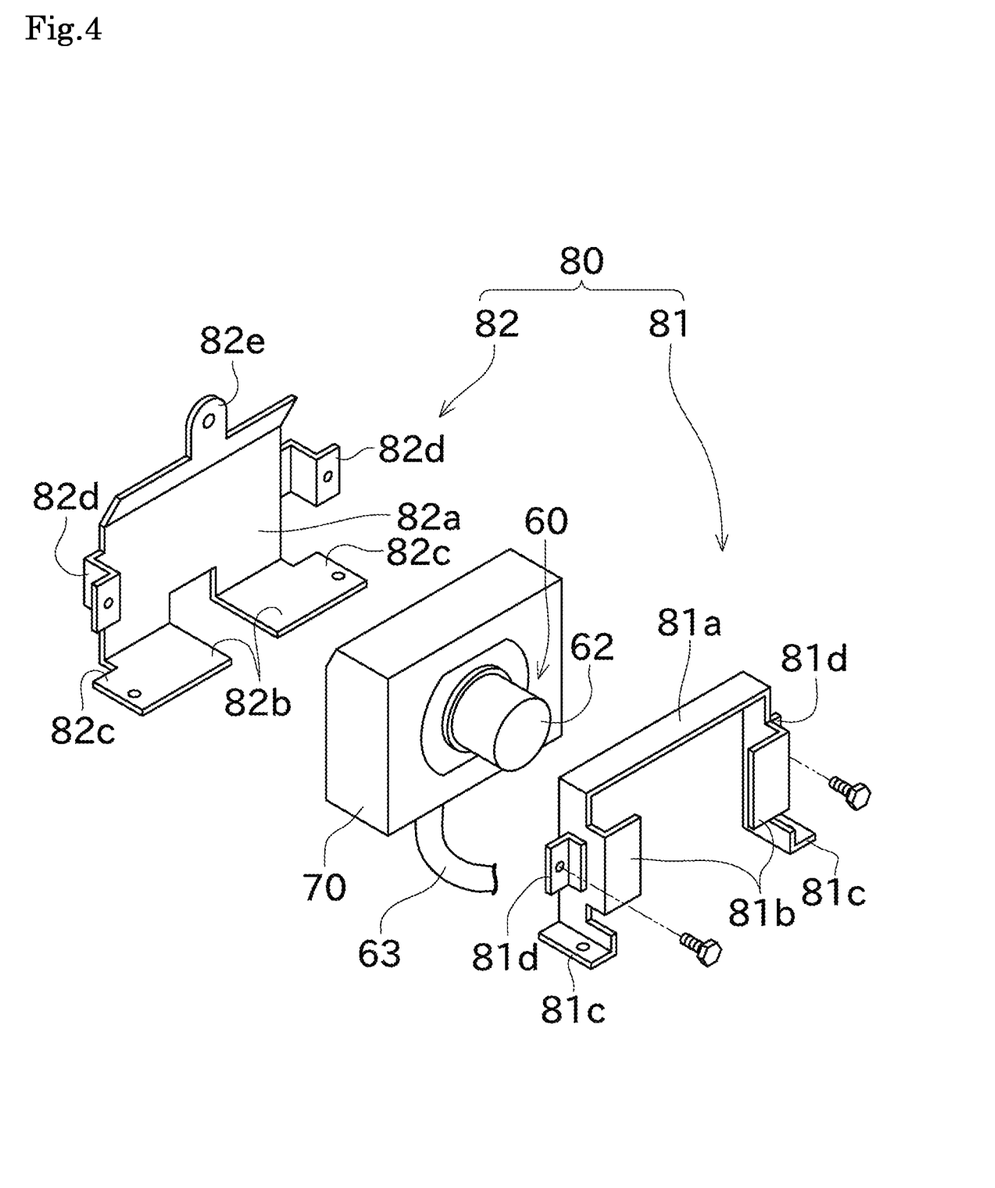
FIG. 4 is an exploded perspective view of an attachment cover.
Figure 5:
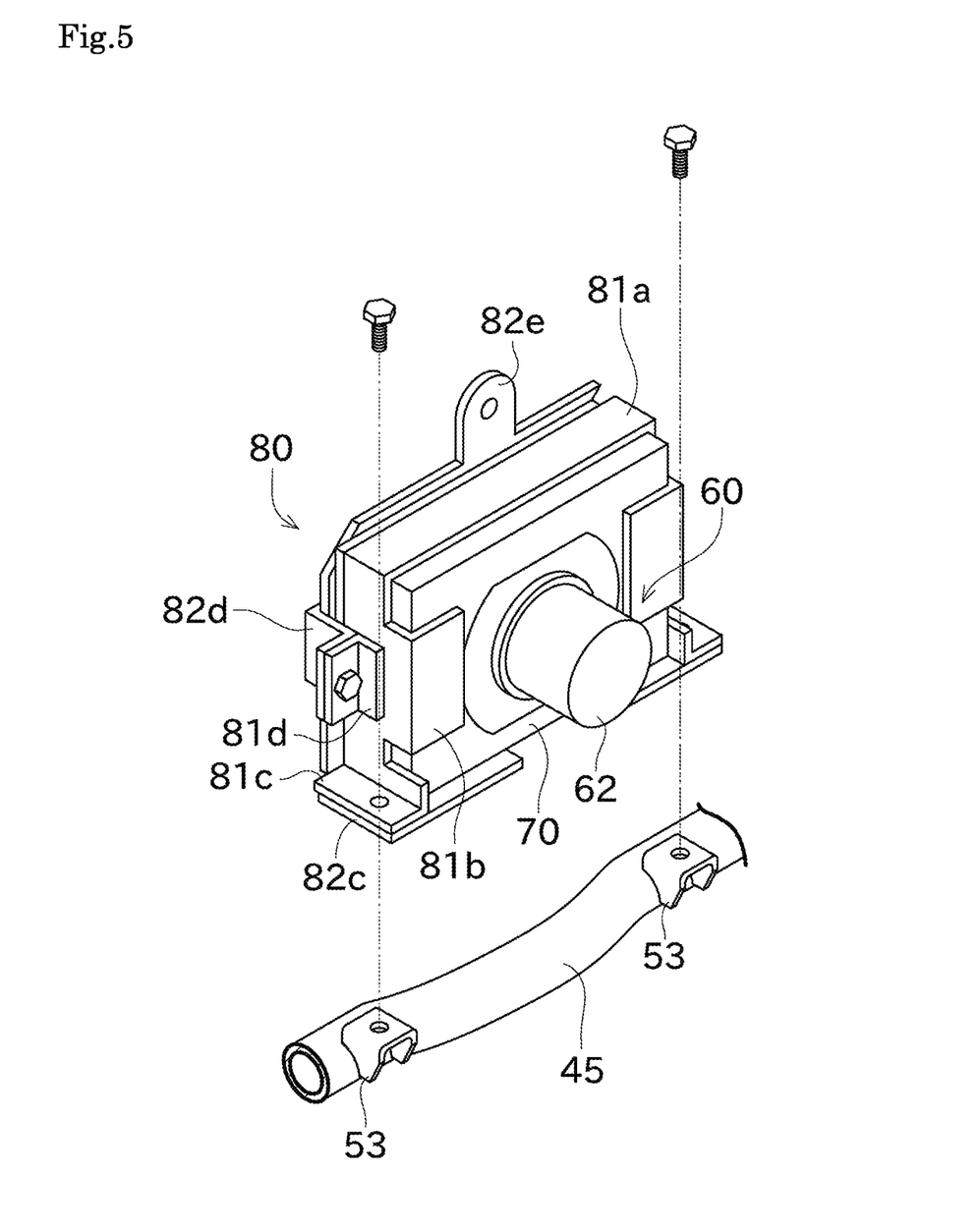
FIG. 5 is a perspective view showing the attachment cover attached to a camera stay.

Next, the attachment structure for attaching the camera 60 to the camera stay 53 will be described with reference to FIG. 3 to FIG. 5. After the vibration reduction cover 70 is attached to the camera 60 as shown in FIG. 3, the attachment cover 80 is further attached to the camera 60 as shown in FIG. 4. Thereafter, the attachment cover 80 is attached to the camera stay 53 as shown in FIG. 5.

The camera 60 is a rectangular shape (a rectangular parallelepiped shape, a cuboid shape) as shown in FIG. 3. In this specification, a rectangular shape includes a substantially rectangular shape. Thus, for example, even if at least one of the six surfaces includes a curved surface or a step, the camera 60 corresponds to a "rectangular shape". Alternatively, the camera 60 corresponds to a "rectangular shape" even if at least one of the six surfaces is a shape other than a rectangle, or if a lens, a switch, or a connector, etc. is attached to at least one of the six surfaces. In other words, a rectangular shape is any shape in which three pairs of facing surfaces (e.g., top and bottom, left and right) are substantially recognizable.

The camera 60 is provided with a main body 61, an intake lens (intake part) 62, and a harness 63. The main body 61 is a rectangular box-shaped member, in which an image sensor and the like are arranged inside. The intake lens 62 is a portion protruding in a certain direction from one surface of the main body 61. The intake lens 62 includes a lens for taking in light from an outside. The harness 63 includes a power supply line to the main body 61 and a signal line for outputting image data obtained by the image sensor of the main body 61 to the control unit described above. The image data may be output wirelessly instead of wired.

The vibration reduction cover 70 is made of an elastic and flexible material (anti-vibration material) such as rubber. Accordingly, by deforming (enlarging) the vibration reduction cover 70, the vibration reduction cover 70 can be attached to the camera 60. As shown in FIG. 3, the outer shape of the vibration reduction cover 70 is a rectangular shape similar to the camera 60. In the vibration reduction cover 70, a space is formed in which the camera 60 can be arranged. The vibration reduction cover 70 has ribs 71, a closure 72, an opening portion 73, and an insertion portion 74.

The ribs 71 are formed on the inner surface of the vibration reduction cover 70. The vibration reduction cover 70 has an open back for attaching the camera 60. The ribs 71 are formed on all surfaces of the inner surface of the vibration reduction cover 70 except the surface on which the back of the camera 60 contacts. The closure 72 is formed on the back of the vibration reduction cover 70. The closure 72 can change its position between an open state in which it is folded outwardly to increase the rear opening, and a closed state (as shown) in which it contacts the rear of the camera 60. The closure 72 is configured to be easily deformable to facilitate attaching of the camera 60. Specifically, the closure 72 has a crank-like bend and is also thinner than the other five surfaces.

The closure 72 also has function of reducing vibration of the camera 60 after the camera 60 is attached. All six surfaces of the vibration reduction cover 70 of this embodiment contacts the camera 60. As long as the vibration reduction cover 70 contacts with at least two facing surfaces of the camera 60, the number of contacting surfaces of the vibration reduction cover 70 may be five or fewer. Even in that case, it is possible to obtain stronger anti-vibration properties than in Japanese Patent No. 6178862.

The opening portion 73 is a through hole formed in the front surface of the vibration reduction cover 70. The opening portion 73 is a portion for exposing the intake lens 62 of the camera 60 to the outside. The opening portion 73 allows the vibration reduction cover 70 to contact all six surfaces of the camera 60 without interfering with the photographing of the camera 60. The opening portion 73 may have a different configuration as long as the intake lens 62 is capable of taking in light from the outside. For example, a transparent member (a member through which visible light is transmitted) may be provided by insert molding to block the opening portion 73.

The insertion portion 74 is a portion for inserting the harness 63 of the camera 60. The insertion portion 74 may be a through hole or a notch. The formation of the insertion portion 74 allows the vibration reduction cover 70 to contact all six surfaces of the camera 60 without interfering with the connection of the harness 63.

The attachment cover 80 is made of metal or a hard resin. As shown in FIG. 4, the attachment cover 80 has a first cover 81 and a second cover 82. The first cover 81 has a frame portion 81a, a front hold portion 81b, a lower attachment portion (first attachment portion) 81c, and a joint portion 81d. The second cover 82 has a rear hold portion 82a, a lower hold portion 82b, a lower attachment portion (first attachment portion) 82c, a joint portion 82d, and an upper attachment portion (second attachment portion) 82e.

The frame portion 81a holds the upper, left, and right sides of the vibration reduction cover 70. The front hold portion 81b holds the front surface of the vibration reduction cover 70. The front hold portion 81b holds a position that avoids the intake lens 62 (i.e., the opening portion 73). If the intake lens 62 is surrounded by an inclined surface, the front hold portion 81b should hold a position that avoids the inclined surface.

The lower attachment portion 81c is a portion for attaching the first cover 81 to the camera stay 53. The joint portion 81d is a portion for joining the first cover 81 and the second cover 82. The lower attachment portion 81c and the joint portion 81d each have an insertion hole for inserting a bolt or other fixture.

The rear hold portion 82a holds the back of the vibration reduction cover 70 (e.g., the closure 72). The lower hold portion 82b holds the lower surface of the vibration reduction cover 70. In addition, an insertion portion for inserting the harness 63 is formed in the lower hold portion 82b. The insertion portion is a notch in this embodiment but may be a through hole.

The lower attachment portion 82c is a portion for attaching the second cover 82 to the camera stay 53. The lower attachment portion 82c has a shape in which the lower hold portion 82b is extended horizontally. The joint portion 82d is a portion for joining the first cover 81 and the second cover 82. The lower attachment portion 82c and the joint portion 82d each have an insertion hole for inserting a bolt or other fixture. As shown in FIG. 5, the lower attachment portion 81c and the lower attachment portion 82c are tighten together. Specifically, the lower attachment portion 81c and the lower attachment portion 82c are stacked and attached to the camera stay 53 by using a common fixture. This allows the first cover 81 and the second cover 82 to be joined while the attachment cover 80 is attached to the camera stay 53.

Since the joint direction (axial direction of the fixture) of the joint portions 81d, 82d is in the front-rear direction, the joint enables the vibration reduction cover 70 to be firmly held so that the vibration reduction cover 70 is sandwiched between the front hold portion 81b and the rear hold portion 82a. This reduces rattling in the front-rear direction and improves vibration reduction. Similarly, since the joint direction (axial direction of the fixture) of the lower attachment portions 81c, 82c is up-down direction, the joint enables the vibration reduction cover 70 to be firmly held so that the vibration reduction cover 70 are sandwiched between the frame portion 81a and the lower hold portion 82b. This reduces rattling in the up-down direction and improves vibration reduction. In other words, in this embodiment, one surface of a pair of surfaces of the vibration reduction cover 70 facing each other in a first direction is held by the first cover 81 and the other surface of them is held by the second cover 82. The first cover 81 and the second cover 82 are joined in the first direction. This reduces rattling in the first direction and improves vibration reduction.

The front hold portion 81b and the portion of the front surface of the vibration reduction cover 70 to be held are parallel planes. Therefore, since both of them are in contact with the surface, the force is applied evenly and stable holding can be achieved. Other five surfaces have the same configuration and the function as that of the surface described above.

The upper attachment portion 82e is a portion to which the connection member 90 described below is attached. The upper attachment portion 82e has a shape in which a portion of the rear hold portion 82a is extended upwardly (in detail, upwardly obliquely forward).

Figure 6:
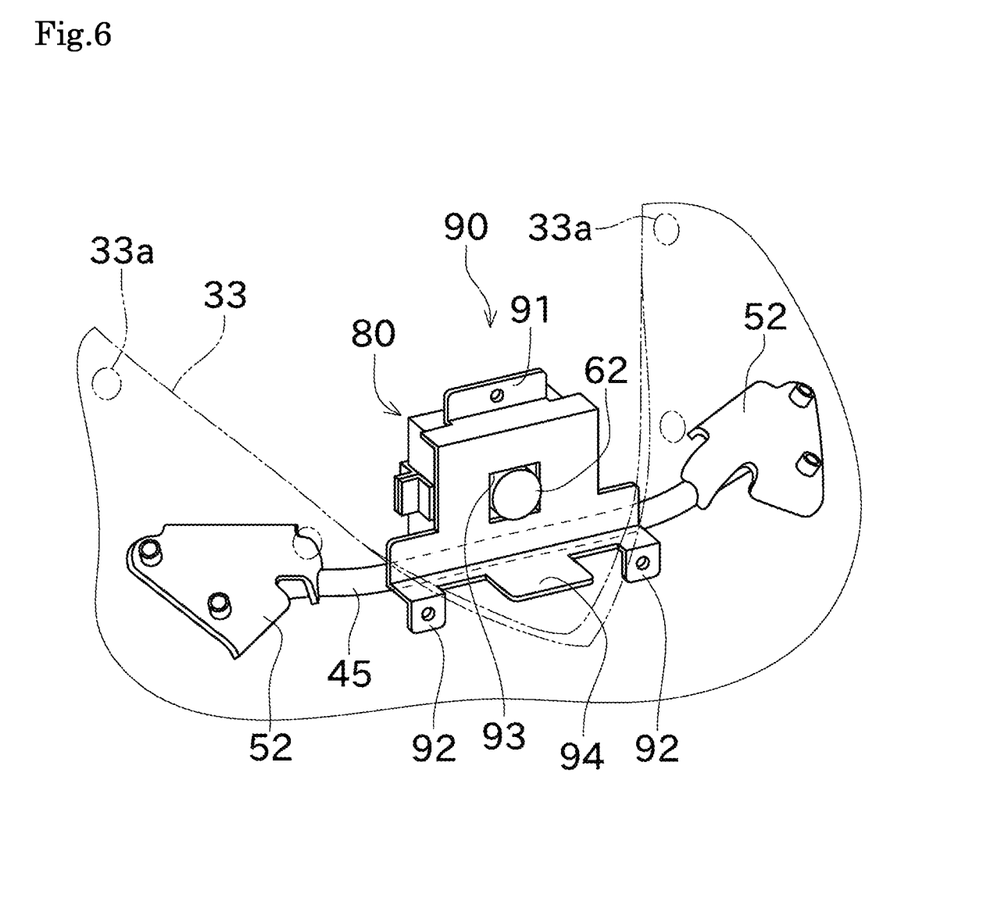
FIG. 6 is a perspective view of vicinity of a connection member.

Next, with reference to FIG. 6, the connection member 90 will be described. FIG. 6 shows a state in which the connection member 90 is further attached after the camera 60 is attached to the camera stay 53. In FIG. 6, the front cowl 33 is appended with a chain line in order to show the positional relationship between the front cowl 33 and the connection member 90.

The connection member 90 is a member for attaching the camera 60 more firmly and for preventing the camera 60 from being seen from the front. The connection member 90 is arranged so that at least a part of the connection member 90 overlaps the camera 60 in a front view. The connection member 90 has an upper attachment portion 91, a cowl attachment portion 92, an opening portion 93, and a block portion 94.

The upper attachment portion 91 is a portion for attaching with the upper attachment portion 82e of the second cover 82. The upper attachment portions 82, 91 have an insertion hole for inserting bolt or other fixture. With this configuration, the attachment cover 80 and the connection member 90 are attached.

The upper attachment portion 82e is configured to extend upward from the rear hold portion 82a, the upper attachment portion 82e is at a higher position than the camera 60. Accordingly, the attachment cover 80 is attached to the connection member 90 at a higher position than the camera 60. On the other hand, the lower attachment portion 82c is configured to extend horizontally from the lower hold portion 82b. Accordingly, the contact point between the lower attachment portion 82c and the camera stay 53 is at a lower position than the camera 60. In other words, the attachment cover 80 is attached to the camera stay 53 at a lower position than the camera 60. Thus, in this embodiment, since the attachment cover 80 is attached to different members at both a position higher than the camera 60 and a position lower than the camera 60, the posture of the camera 60 can be stabilized.

The attachment cover 80 is attached to the camera stay 53 forward of the center of the vehicle length direction of the camera 60. On the other hand, the attachment cover 80 is attached to the connection member 90 behind the center of the camera 60 in the vehicle length direction. Accordingly, the posture of the camera 60 can be further stabilized.

The connection member 90 have the two cowl attachment portions 92. Each of the cowl attachment portions 92 is forward of and lower than the camera 60. Each of the cowl attachment portions 92 is arranged at left side and right side, respectively so that the left cowl attachment portion is located left side of the center of the vehicle width direction of the connection member 90 (or the camera 60) and the right cowl attachment portion is located right side of the center of the vehicle width direction of the connection member 90 (or the camera 60). The cowl attachment portion 92 is attached to the front cowl 33. Specifically, attaching holes are formed in the cowl attachment portion 92 and the front cowl 33. Bolts or other fixtures is used in a state where the cowl attachment portion 92 and the front cowl 33 is aligned. This allows the cowl attachment portion 92 to be attached to the front cowl 33.

The opening portion 93 is a portion for exposing the intake lens 62 of the camera 60 to the outside. The opening portion 93 is formed so as to be located overlapping the intake lens 62 in the front view. In this embodiment, the shape of the opening portion 93 is polygonal. The shape of the opening portion 93 may be circular or any other shape. The intake lens 62 may project forward from the opening portion 93, or the front end of the intake lens 62 and the front end of the opening portion 93 may be at substantially the same position in the vehicle length direction.

The block portion 94 is formed between the cowl attachment portions 92. The block portion 94 is located in the center of the vehicle width direction of the connection member 90 (or the camera 60) and is formed to project forward. In this embodiment, a V-shaped opening is formed in the front cowl 33, and the windscreen 31 is arranged in the opening portion. The inside of the front cowl 33 may be visible through the windscreen 31 from the base end of the V-shaped opening portion. Therefore, the block portion 94 is arranged to prevent the inside of the front cowl 33 from being seen. In this embodiment, the block portion 94 is rectangular in shape. The block portion 94 may be a V-shape (a shape in which the length in the vehicle width direction becomes shorter as it approaches the front) to match the V-shaped opening.

Figure 7:
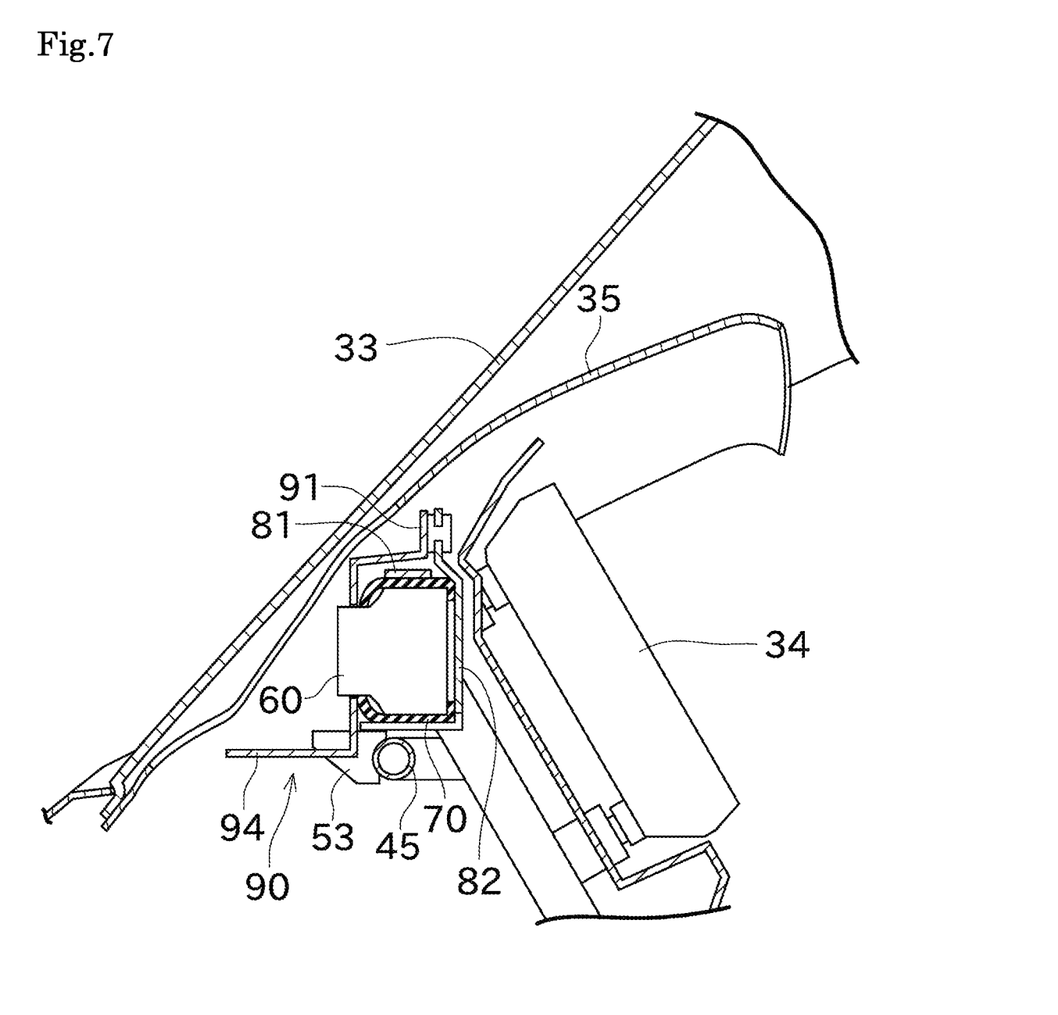
FIG. 7 is a cross-sectional view of a windscreen, a meter visor, and the camera.

Next, with reference to FIG. 6 and FIG. 7, an attachment structure of the windscreen 31 and a meter visor 35 will be briefly described. FIG. 7 is a cross-sectional view of the camera 60 and the metering device 34 cut in a plane passing through the center of the vehicle width direction.

The windscreen 31 is attached by using the attachment holes 33a (FIG. 6) formed in the front cowl 33. The meter visor 35 is a cover that covers the front end and/or the top end of the meter device 34, as shown in FIG. 7. The meter visor 35 is arranged behind the windscreen 31. The meter visor 35 is attached to the front cowl 33 in the same manner as the windscreen 31. The attachment hole 33a is different from the attachment hole for attaching the connection member 90.

In other words, in this embodiment, the attachment structure for attaching the camera 60 (vibration reduction cover 70, attachment cover 80, connection member 90, camera stay 53, etc.) is independent of the attachment structure for attaching the windscreen 31 and the meter visor 35. Therefore, the windscreen 31 and the meter visor 35 can be removed without removing the camera 60. Accordingly, it is not necessary to remove the camera 60 when the windscreen 31 is removed in order to prevent chemicals from adhering to the windscreen 31 during car washing. Conversely, the camera 60 can be removed without removing the windscreen 31 and the meter visor 35. Accordingly, it is not necessary to remove the windscreen 31 and the meter visor 35 when maintaining the camera 60.

As described above, the motorcycle 1 of this embodiment includes the camera stay 53, the camera 60, the vibration reduction cover 70, and the attachment cover 80. The camera 60 photographs the front area of the motorcycle 1. The vibration reduction cover 70 is made of the elastic material and covers at least two surfaces of the camera 60 facing each other. The attachment cover 80 holds the camera 60 via the vibration reduction cover 70 and is attached to the camera stay 53.

This allows the camera 60 to be attached to the vehicle body 10 while reducing the vibration of the camera 60 with a simple structure. In addition, by covering the two facing surfaces of the camera 60 with the vibration reduction cover 70 and holding it with the attachment cover 80, the camera 60 can be firmly attached to the camera stay 53 while reducing the vibration.

The motorcycle 1 of this embodiment includes the front cowl 33 and the connection member 90. The front cowl 33 is arranged at the front part of the vehicle (motorcycle). The connection member 90 connects the attachment cover 80 to the front cowl 33.

The attachment cover is attached to not only the camera stay 53 but also the front cowl 33 via the connection member 90. Therefore, the posture of the camera 60 can be stabilized.

In the motorcycle 1 of this embodiment, the attachment cover 80 includes lower attachment portions 81c, 82c and upper attachment portion 82e. The lower attachment portions 81c, 82c are attached to the camera stay 53 so that the attachment position is below the camera 60. The upper attachment portion 82e is attached to the connection member 90 so that the attachment position is above the camera 60.

Accordingly, since the camera 60 is attached to the attachment cover 80 at below and above the camera 60, the posture of the camera 60 is more stabilized.

In the motorcycle 1 of this embodiment, the camera 60 includes the main body 61 and the intake lens 62 that takes in light from the outside into the main body 61. The connection member 90 has the opening 93 so that the opening portion 93 and the intake lens 62 overlaps in a front view.

Since the connection member 90 is attached to the attachment cover 80 above the camera 60, the layout is likely to be such that the connection member 90 overlaps the intake lens 62 of the camera 60. In this regard, the opening portion 93 formed in the connection member 90 prevents the connection member 90 from interfering with the photographing of the camera 60.

The motorcycle 1 of this embodiment includes the windscreen 31 for protecting the driver from the driving wind. The camera 60 is arranged at the rear of the windscreen 31 and photographs through the windscreen 31.

This allows the camera 60 to be protected from flying objects or the like.

In the motorcycle 1 of this embodiment, the windscreen 31 is attached to the front cowl 33. The attachment structure for attaching the connection member 90 to the front cowl 33 is independent of the attaching structure for attaching the windscreen 31 to the front cowl 33.

This allows only one of either the camera 60 or the windscreen 31 to be removed. Therefore, only the camera 60 can be removed for maintenance or only the windscreen 31 can be removed for car washing.

The motorcycle 1 of this embodiment includes the support frame 40 which is located in front of the head pipe 11, and supported by the head pipe 11. The support frame 40 supports at least one electrical component other than the camera 60. The support frame 40 includes a plurality of stays, and one of the stays is the camera stay 53.

This allows the camera 60 and other electrical components to be supported together.

In the motorcycle 1 of this embodiment, the attachment cover 80 has the first cover 81 and the second cover 82. By joining the first cover 81 and the second cover 82, the vibration reduction cover 70 is sandwiched between the first cover 81 and the second cover 82. Both of the first cover 81 and the second cover 82 are attached together on the camera stay 53.

Accordingly, since not only joining the first cover 81 and the second cover 82 but also attaching the first cover 81 and the second cover 82 to the camera stay 53 together, the camera 60 can be held firmly.

In the motorcycle 1 of this embodiment, the camera 60 is a rectangular shape. The vibration reduction cover 70 covers each of the six surfaces of the camera 60. The attachment cover 80 contacts each of the six surfaces of the vibration reduction cover 70.

This can make it difficult for vibrations in various directions to be transmitted to the camera 60.

While a preferred embodiment and variations of the present invention have been described above, the configurations described above may be modified, for example, as follows.

The camera 60 of the above embodiment has a shape in which the intake lens 62 protrudes from the main body 61. The intake lens 62 of the camera 60 need not protrude from the main body 61. The camera 60 is not limited to a rectangular shape and may have different shapes.

The vibration reduction cover 70 of the above embodiment is an integrally configured member. The vibration reduction cover 70 may be composed of a plurality of components.

The attachment cover 80 of the above embodiment consists of two separable parts. The attachment cover 80 may consists of one part or three or more parts. The plurality of parts consisting of the attachment cover 80 may be configured to be welded or press-fitted together instead of using fixtures such as bolts.

In the above embodiment, an example of applying the present invention to a motorcycle 1 is described, but the present invention can also be applied to other straddle vehicles. Other straddle vehicles are, for example, vehicles with two front wheels and one rear wheel, vehicles with one front wheel and two rear wheels, vehicles with two front wheels and two rear wheels, or the like. Other example of a four-wheeled vehicles are all terrain vehicle (ATV), which is primarily used for driving on unpaved terrain.

What is claimed is:
1. A straddle vehicle, comprising:
a camera stay;
a camera photographing an area in front of the straddle vehicle;
a vibration reduction cover made of an elastic material and covering at least two surfaces of the camera facing each other;
an attachment cover holding the camera via the vibration reduction cover and attached to the camera stay;
a front cowl arranged at a front part of the straddle vehicle; and
a connection member including a single member connecting the attachment cover to the front cowl, the connection member including a first attachment portion couplable to the attachment cover and a second attachment portion couplable to the front cowl.
2. The straddle vehicle according to claim 1, further comprising
a support frame being located in front of a head pipe and supported by the head pipe, the support frame supporting at least one electrical component other than the camera,
wherein the support frame has a plurality of stays and one of the stays is the camera stay.
3. The straddle vehicle according to claim 1, wherein the attachment cover includes a first cover and a second cover, wherein by joining the first cover and the second cover, the vibration reduction cover is sandwiched between the first cover and the second cover, and wherein both of the first cover and the second cover are attached together on the camera stay.

4. The straddle vehicle according to claim 1, wherein the camera is a rectangular shape, wherein the vibration reduction cover covers each of the six surfaces of the camera, and wherein the attachment cover contacts each of the six surfaces of the vibration reduction cover.

5. A straddle vehicle, comprising:
a camera stay;
a camera photographing an area in front of the straddle vehicle;
a vibration reduction cover made of an elastic material and covering at least two surfaces of the camera facing each other;
an attachment cover holding the camera via the vibration reduction cover and attached to the camera stay;
a front cowl arranged at a front part of the straddle vehicle; and
a connection member connecting the attachment cover to the front cowl, the connection member including a first attachment portion couplable to the attachment cover and a second attachment portion couplable to the front cowl,
wherein the attachment cover comprises:
a lower attachment portion attached to the camera stay so that an attachment position is below the camera; and
an upper attachment portion attached to the connection member so that an attachment position is above the camera.

6. The straddle vehicle according to claim 5, wherein the camera includes a main body and an intake part taking in light from outside into the main body, and wherein the connection member has an opening portion so that the opening portion and the intake part are overlapped in a front view.

7. A straddle vehicle, comprising:
a camera stay;
a camera photographing an area in front of the straddle vehicle;
a vibration reduction cover made of an elastic material and covering at least two surfaces of the camera facing each other;
an attachment cover holding the camera via the vibration reduction cover and attached to the camera stay;
a front cowl arranged at a front part of the straddle vehicle;
a connection member connecting the attachment cover to the front cowl, the connection member including a first attachment portion couplable to the attachment cover and a second attachment portion couplable to the front cowl; and
a windscreen protecting a driver from a driving wind,
wherein the camera is located at rear of the windscreen and photographs through the windscreen.

8. The straddle vehicle according to claim 7, wherein the windscreen is attached to the front cowl and wherein an attachment structure for attaching the connection member to the front cowl is independent of an attachment structure for attaching the windscreen to the front cowl.

* * * * *